Aug. 31, 1965
J. H. SPENCE
3,203,604
COMBINATION VEHICLE LUGGAGE CARRIER AND SUNSHADE, AND
MOUNTING ASSEMBLY THEREFOR
Filed April 6, 1962
3 Sheets-Sheet 1
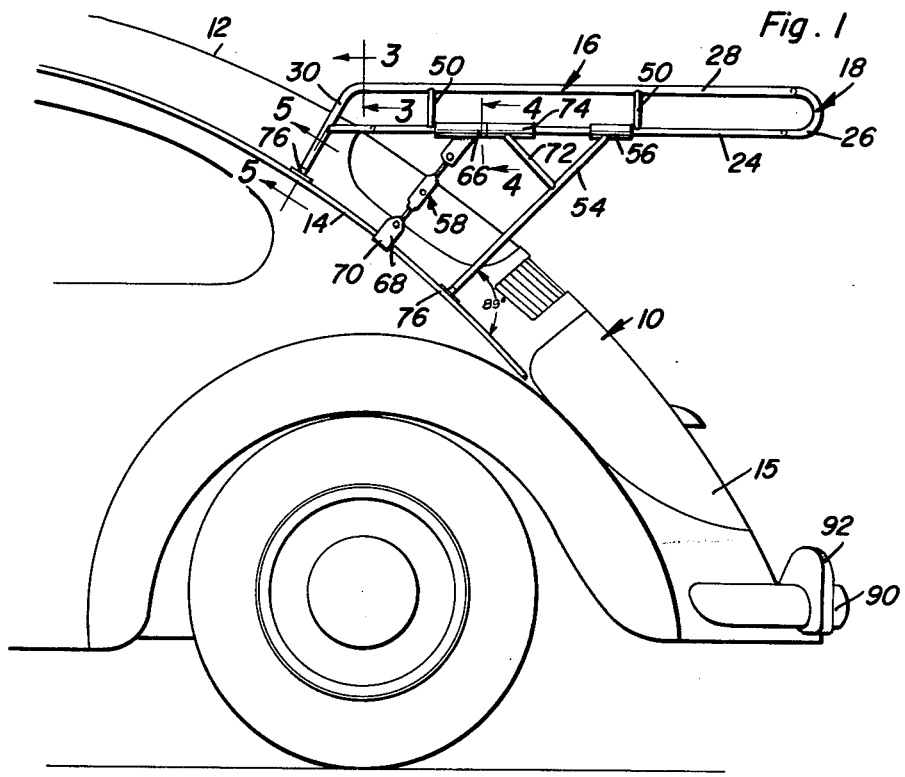
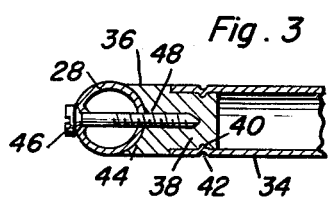
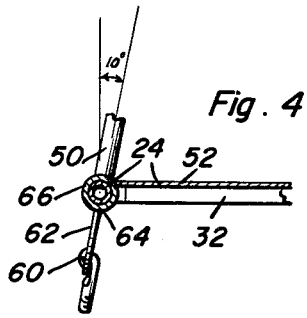
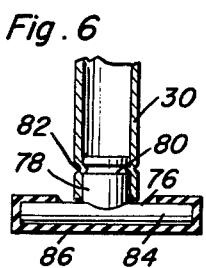
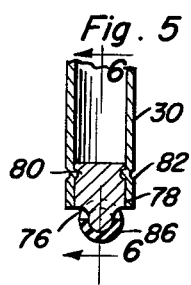
James H. Spence
INVENTOR.
BY
Attorneys Aug. 31, 1965  J. H. SPENCE  3,203,604
COMBINATION VEHICLE LUGGAGE CARRIER AND SUNSHADE, AND
MOUNTING ASSEMBLY THEREFOR
Filed April 6, 1962  3 Sheets-Sheet 2

James H. Spence
INVENTOR.

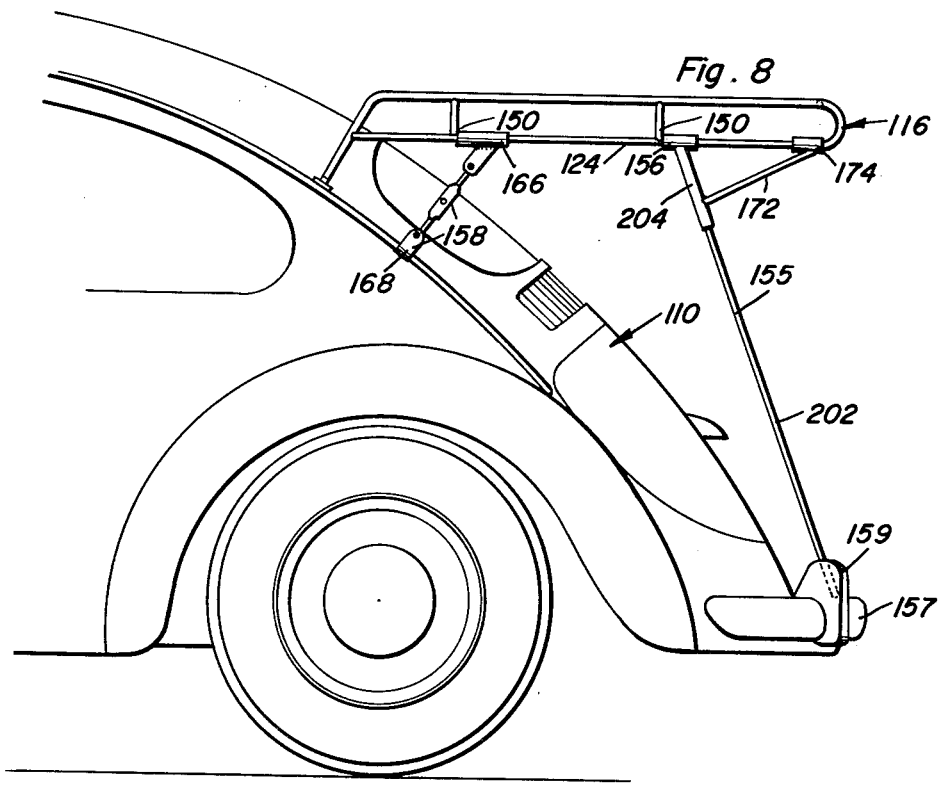
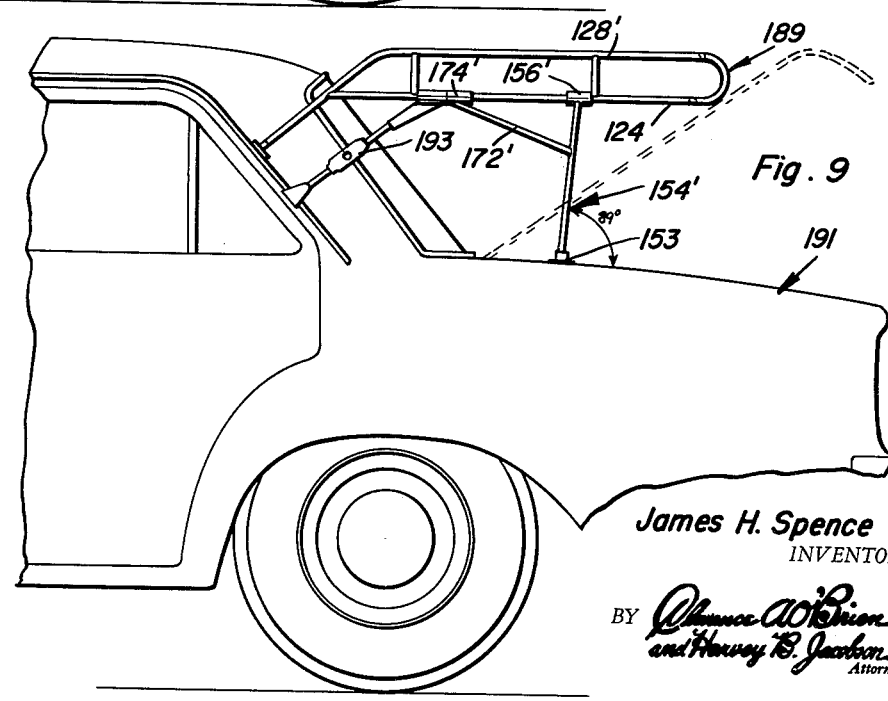

United States Patent Office 3,203,604
Patented Aug. 31, 1965

1

3,203,604
COMBINATION VEHICLE LUGGAGE CARRIER AND SUNSHADE, AND MOUNTING ASSEMBLY THEREFOR
James H. Spence, Burlingame, Calif.
(P.O. Box 38, Peoria, Ariz.)
Filed Apr. 6, 1962, Ser. No. 185,594
3 Claims. (Cl. 224—42.1)

This invention relates to a novel and useful combination vehicle luggage carrier and sunshade which comprises an improvement over the luggage carrier disclosed in my co-pending application U.S. Serial No. 94,915, filed March 10, 1961, now Patent No. 3,116,861, issued January 7, 1964.

The vehicle luggage carrier of the instant invention has been primarily designed to provide a means whereby the ability of compact and other small vehicles to carry luggage and other articles such as small boats and the like which cannot be readily carried within the vehicle will be augmented. The luggage rack of the instant invention is constructed in a manner whereby it may be readily mounted above the rear window of a vehicle and supported from the opposite sides of the body of the vehicle or the rain gutters thereof with the uppermost portion of the carrier disposed below the uppermost point of the vehicle top with which it is associated. By mounting the luggage carrier from the sides of a vehicle and with the load-carrying platform thereof in alinement with or in close relation to a horizontal plane passing through the uppermost portion of a vehicle rear window, the view by the driver of the vehicle through the rear window is not obscured. Heretofore, vehicle luggage racks have been supported directly above the rear deck portion of a vehicle in such a manner that when provided with a load having vertical height the view through the rear window is obscured. In addition, some vehicle luggage racks have been primarily designed for securement to the top of the vehicle at its highest point with the load-carrying portion thereof spaced above the vehicle top. If this type of luggage carrier is utilized on "compact" or "sub-compact" vehicles, when loaded, the load supported by the luggage carrier or rack greatly increases the frontal area of the vehicle and thereby greatly reduces the maximum cruising speed of these small vehicles which are normally under-powered as compared to the power provided with a full size passenger vehicle.

In addition, if the frontal area of a small underpowered vehicle is appreciably increased, not only is the maximum cruising speed of the vehicle reduced but the fuel economy normally associated with smaller vehicles is greatly reduced even when the vehicle is traveling at speeds slower than maximum cruising speed. Accordingly, should a small vehicle be provided with the usual type of luggage rack which projects upwardly above the top of the vehicle and appreciably increases the frontal area of the vehicle, one of the advantages normally associated with small vehicles becomes insignificant.

It is therefore the main object of this invention to provide a combination vehicle luggage carrier and sunshade provided with mounting means whereby the carrier may be supported in a position with its load platform or supporting panel disposed in a horizontal plane adjacent the upper portion of a vehicle rear window and spaced appreciably below the top of the vehicle. In this manner, neither of the adverse conditions of having a rear window partially obscured or the frontal area of the vehicle appreciably increased will be realized by the addition of the luggage carrier to a small under-powered vehicle.

Still another object of this invention, in accordance with the immediately preceding object, is to provide a

2 luggage carrier provided with a panel-like load supporting platform or the like for supporting a load, which platform will have its forward edge portion disposed immediately adjacent or in overlying relation to the upper edge of the rear window of the vehicle to which the luggage carrier is secured. In this manner, not only does the luggage carrier serve the purpose of providing a support for excess luggage and the like, but it will also, whether or not having a load disposed thereon, serve as a sunshade for the rear window of the vehicle thereby greatly reducing the amount of direct sunlight which falls on the rear window. Although direct sunlight falling on a clean window does not appreciably affect the visibility through the window, should the window have any foreign material such as dust or rain spots thereon, the dust and/or rain spots and the like are far more visible when disposed in direct sunlight. In addition, direct sunlight passing through a vehicle rear window will cause a reflection of the portion of the vehicle disposed beneath the rear window to be visible by a person looking through the window from the interior of the vehicle. This reflection also decreases the effective vision of the person looking through the rear window.

A still further object of this invention, in accordance with the immediately preceding objects, is to provide a mounting assembly for the vehicle luggage carrier which will adapt the luggage carrier to be secured to various types of vehicles with no alterations to the vehicle to which the luggage carrier is to be secured.

A final object to be specifically enumerated herein is to provide a combination vehicle luggage carrier and sunshade in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of the rear portion of a "small" vehicle shown with the vehicle luggage carrier of the instant invention mounted thereon;

FIGURE 3 is an enlarged fragmentary transverse vertical sectional view taken substantially upon the plane indicated by the section line 3—3 of FIGURE 1;

FIGURE 4 is an enlarged fragmentary transverse vertical sectional view taken substantially upon the plane indicated by the section line 4—4 of FIGURE 1;

FIGURE 5 is an enlarged fragmentary transverse sectional view taken substantially upon the plane indicated by the section line 5—5 of FIGURE 1;

FIGURE 6 is a fragmentary longitudinal vertical sectional view taken substantially upon the plane indicated by the section line 6—6 of FIGURE 5;

FIGURE 8 is a fragmentary side elevational view similar to FIGURE 1 and showing a further modified form of luggage carried; and FIGURE 9 is a fragmentary side elevational view similar to FIGURE 7 and showing a still further modified form of luggage carrier.

Figures 2, 7:
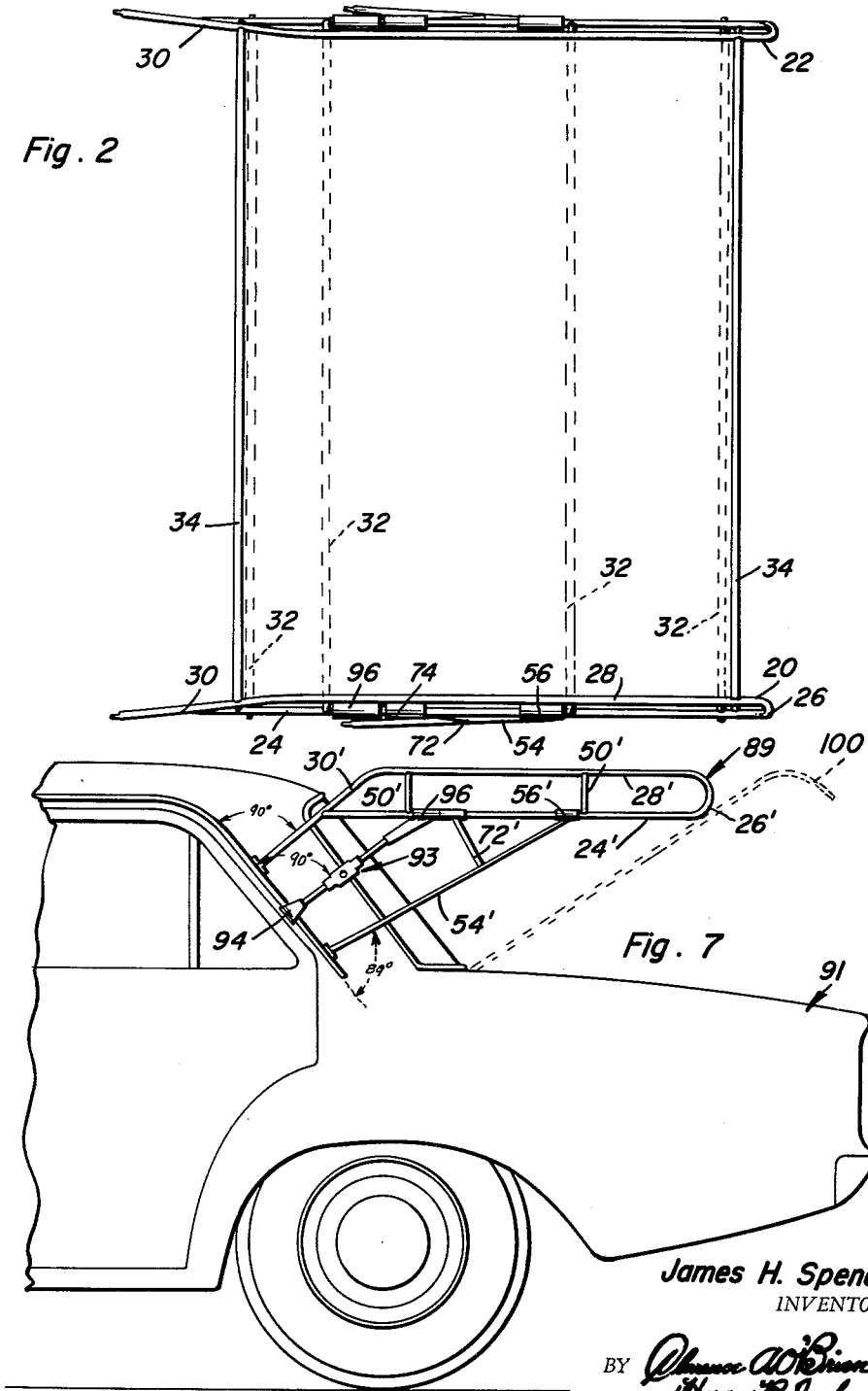
FIGURE 2 is a top plan view of the vehicle luggage carrier.
FIGURE 7 is a fragmentary side elevational view of the rear portion of a compact vehicle showing a slightly modified form of luggage carrier mounted thereon.

Referring now more specifically to the drawings the numeral 10 generally designates a vehicle which includes a top 12 which curves downwardl yat its rear end and has a pair of rain gutters 14 extending along opposite sides thereof. The vehicle 10 is of the rear engine type and includes a hinged engine covered 15 which is pivoted at its upper end for upward and rearward swinging movement of its free lower end to provide access to the engine compartment (not shown) disposed therebeneath.

The vehicle luggage carrier of the instance invention is generally designated by the reference numeral 16 and includes a load platform assembly generally referred to by the reference numeral 18. the load platform assembly 18 includes a pair of longitudinally extending opposite side sections 20 and 22 which are similarly formed and it will be noted that each side section includes a lower opposite side member 24 which extends longitudinally of the load platform assembly 18 and is provided with a rear end portion 26 which is curved back upon itself and forms an upper forwardly projecting side member 28. The forward end of each upper side member 28 is turned downwardly at its forward end to form a forward supporting member 30. The extreme forward end of each lower side member 24 is secured to the corresponding supporting member 30 intermediate its opposite ends in any convenient manner such as by welding.

The lower side members 24 are interconnected by means of a plurality of transverse members 32 spaced longitudinally of the side members 24 and the side members 28 are interconnected by means of transverse members 34.

As can best be seen from FIGURE 3 of the drawings each of the transverse members 34 has a plug 36 engaged with its opposite ends. Each of the plugs 36 includes a diametrically reduced portion 38 which has a circumferential groove 40 formed therein and after the diametrically reduced portion 38 has been inserted in the corresponding end of each transverse member 34, the transverse member 34 is crimped as at 42 to lock the transverse member 34 in engagement with the corrseponding plugs 36. The end of each plug remote from the diametrically reduced end portion 38 thereof is provided with an arcuate seat 44 for seatingly receiving the corresponding portion of the associated side member 28. Then, a fastener 46 is secured through the side member 28 and threadedly engaged in the threaded bore 48 formed in the outer end of the plug 36.

It is to be understood that each of the transverse members 32 is secured to the corresponding portion of the corresponding side member 24 in a manner similar to that by which the transverse members 34 are secured to the side members 28.

A plurality of vertical brace members 50 are secured between corresponding ones of the side members 24 and 28 at points spaced longitudinally along the load platform assembly 18.

A panel-like load supporting member 52 is secured over the transverse members 32 and between the side members 24 in any convenient manner. The load supporting member may be constructed of light weight material and it is preferable that it be imperforate in order to prevent light from passing therethrough when the luggage carrier 16 is empty.

The luggage carrier 16 also includes a pair of rear supporting members 54 which are elongated and depend from the corresponding side members 24. The upper end of each rear supporting member 54 has a transverse sleeve 56 secured thereto which rotatably receives the corresponding portion of the associated side member 24. Further, each side of the load supporting platform assembly 18 includes an elongate tension member generally referred to by the reference numeral 58 and it will be noted that the upper end of each of the tension members 58 is provided with a hooked portion 60 engaged with a plate 62 secured in any convenient manner such as by welding 64 to a sleeve 66 which also rotatably receives the corresponding portion of the associated side member 24. The lower end of each of the tension members 58 is also provided with a hooked end portion which is similar to hooked end portion 60 and which is engaged with a J-shaped bracket 68 whose curved portion 70 embraces the lower portion of the corresponding rain gutter 14. Each of the tension members 58 comprises a turnbuckle and in this manner, rain gutters having different curvatures may be compensated for.

An elongated brace member 72 is secured at one end to each of the supporting members 54 at a point spaced intermediate its opposite ends and is disposed at substantially right angles to the supporting member 54. The other end of each elongated brace member 72 is provided with a transverse sleeve 74 which also snugly and rotatably receives the corresponding portion of the side member 24.

Each of the supporting members 30 and 54 is provided with a foot portion 76 and with attention directed to FIGURES 5 and 6 of the drawings it will be noted that each foot portion 76 includes a plug 78 having a circumferential groove 80 formed therein similar to circumferential groove 40. The lower end of the corresponding supporting member is crimped as at 82 to lock the plug 78 in engagement therewith and each of the plugs 78 is provided with a generally cylindrical crosshead portion 84 which has a resilient sleeve 86 disposed thereabout. Each of the foot portions 76 is snugly received in the corresponding one of the gutters 14 and in this manner the luggage carrier 16 is fixedly supported on the vehicle 10 from the rain gutters 14 thereof.

From FIGURES 2 and 4 of the drawings it will be noted that the medial planes of the corresponding pairs of side members 24 and 28 are upwardly convergent and that each of the medial planes is disposed at an angle of approximately 10° from a vertical position. In addition, from FIGURE 2 of the drawings it will be noted that the supporting and tension members 30, 54 and 58 are each also inclined approximately 10° from the vertical.

In operation, the vehicle luggage carrier 16 is secured to the vehicle 10 as illustrated in FIGURE 1 of the drawings and the supporting members 30 and 54 together with the tension members 58 may be properly tensioned by adjustment of the turnbuckles comprising the tension members 58. It will be noted that the rear end of the sleeve 56 abuts against the rearmost brace 50 and that the forward end of each sleeve 66 abuts against the forwardmost brace 50. In addition, it will be noted that the forward end of the sleeve 74 abuts against the rear end of the sleeve 66. Accordingly, the sleeves 56, 66 and 74 are prevented from being axially displaced on the corresponding side member 24.

Any tendency of a load on the luggage carrier 16 to lower the load platform assembly 18 relative to the vehicle 10 when the foot portions 76 and the J-shaped bracket 68 are held in position against movement along the gutters 14 will have a tendency to cant the sleeves 56, 66 and 74 in a clockwise direction about a transversely extending horizontally disposed axis extending through their midportions. The snug fit of the sleeves 56, 66 and 74 with the side members 24 will of course resist this canting action and in addition, the elongated brace member 72, upon any tendency of the supporting member 54 to pivot in a clockwise direction as viewed in FIGURE 1 about its lower end, will tend to urge the portion of the corresponding side member 24 adjacent the upper end of the associated tension member 58 upwardly. This tendency will of course be resisted by that tension member 58.

With attention now directed to FIGURE 7 of the drawings there will be seen a modified form of luggage carrier generally referred to by the reference numeral 89 which is secured to a "compact-type of vehicle" generally referred to by the reference numeral 91. The construction of the luggage carrier 90 is very similar to that of the luggage carrier 16 and the parts of the luggage carrier 90 which are substantially identical to corresponding portions of the luggage carrier 16 have been given prime reference numerals corresponding to those numerals given the corresponding portions of the luggage carrier 16.

The turnbuckle or tension member of the luggage carrier 90 is designated by the reference numeral 93 and is similar in many respects to the tension member 58 in that the J-shaped plate 94 and the sleeve 96 carried by the upper end thereof are fixedly secured to the turnbuckle 92.

The vehicle 91 is provided with a rear deck lid 100 for enclosing the trunk compartment (not shown) thereof and the rear portion of the luggage carrier 90 is disposed so as to enable free raising and lowering of the rear deck lid 100. In most respects, the luggage carrier 90 is similar to the luggage carrier 16.

With attention again directed to FIGURES 1 and 7 of the drawings it will be observed that each of the luggage carriers 16 and 90 is supported entirely from the rain gutters of the corresponding vehicles 10 and 91 respectively. However, it is not necessary that the luggage carriers be supported from the rain gutters but instead they may be supported from the opposite side portion of the body portions of the vehicles 10 and 91. In this instance, suitable brackets may be provided for securing the forward lower end of the forward and rear supporting members 30, 31' and 54, 54' to the opposite sides of the vehicles 10 and 91. If the supporting members are secured to the opposite sides of the body, the lower ends of the elongated tension members 58 and 93 are elongated and provided with a hooked portion having a somewhat greater radius adapted for engagement with the upper portions of the corresponding vehicles defining the rear opposite side windows and doors thereof.

With attention now directed to FIGURES 8 and 9 of the drawings, should it be desired by the ultimate user of either of the luggage carriers previously set forth to carry relatively heavy loads such as heavy luggage and boats, the rear supporting members of the luggage carriers are modified in order to more efficiently support the heavier load. In FIGURE 8 of the drawings, there will be seen a luggage carrier which is generally designated by the reference numeral 116. The luggage carrier 116 is for the most part substantially identical to the luggage carrier 16, and accordingly, portions of the luggage carrier 116 which are identical to corresponding portions of the luggage carrier 16 have been given reference numerals in the one hundred series corresponding to the numerals given the component parts of the luggage carrier 16 in the tens.

The rear supporting members 155 of the luggage carrier 116, each have a lower end portion adapted for engagement with the bumper 157 and bumper guard 159 of the vehicle 110. The upper end of each rear supporting member 155 includes a sleeve 156 similar to sleeve 56 and a laterally outwardly projecting elongated brace member 172 whose end remote from the corresponding rear supporting member 155 is provided with a sleeve 174. The sleeves 156 and 174 rotatably receive the corresponding side members 124 and accordingly, it will be seen that the rear supporting members 155 are supported from the corresponding side members 124 for rotation about the longitudinal axes of the corresponding side members 124. Further, it will be noted that the sleeves 156 each abut the adjacent vertical brace member 150 thereby preventing axial shifting of the sleeves 156 forwardly along the side members 124.

The luggage carrier 189 illustrated in FIGURE 9 also includes a slightly modified rear supporting member 154'. Each of the supporting member 154' includes a foot member 153 on its lower end which is secured to the corresponding side of the vehicle 191 and the upper end of each rear supporting member 154' is provided with a sleeve 156' and a laterally outwardly directed elongated brace member 172'. The outer end of each elongated brace member 172' includes a sleeve 174' and the sleeves 174' and 156' rotatably received in corresponding side members 124'. Therefore, although the angular relationships of the rear supporting members 155 and 154' of FIGURES 8 and 9 relative to a horizontal plane containing the corresponding luggage carriers are different from the corresponding angular relationships between the rear support members 54 and 54', the rear supporting members 155 and 154' function in the same manner. Additionally, it may be of course observed from FIGURES 8 and 9 of the drawings that the luggage carriers 116 and 189 would be expected to be capable of supporting loads heavier than the maximum loads which could be supported by the luggage carriers 16 and 89.

From FIGURE 8 of the drawings it will be noted that the rear supporting members 155 each include a lower portion 202 and an upper portion 204 which is tubular and telescopically receives the upper end of the lower portion 202. In this manner, the upper portion 204 defines a downwardly opening socket in which the upper end of the lower portion 202 can be received and therefore the lower portion 202 of each rear supporting member 155 may be removed for storage purposes. Therefore, it may be seen that the luggage carrier 116 may still be shipped in relatively small containers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted, to falling within the scope of the invention as claimed.

What is claimed as new is as follows:

1. In combination with a vehicle having a roof and an inclined rear window at the rear thereof, load supporting means disposed at the rear of the vehicle generally below the top surface of the roof and directly above at least a major portion of the rear window to reduce the wind resistance of the load supporting means and the load carried thereon during forward movement of the vehicle, said load supporting means including a platform forming a shield for the rear window and upper and lower side members supporting the platform, longitudinally spaced depending forward and rear supporting members attached to each lower side member for supporting the platform in substantially a horizontal position, the lower ends of said supporting members having means thereon abuttingly engaging the vehicle, and rigid, positively adjustable tension members interconnecting the lower side members of the load supporting means and the vehicle between the forward and rear supporting members retaining the forward and rear supporting members in compression thereby locking the load supporting means to the vehicle and preventing fulcruming movement of the rear load supporting member about the lower end thereof, each rear supporting member including a brace substantially disposed at right angles thereto, said brace being connected with the lower side member of the load supporting means for rigidifying the load supporting means in relation to the rear supporting members thereby precluding fulcruming movement of the platform about the rear supporting member, the upper ends of each of the rear supporting members, braces and tension members terminating in an elongated sleeve pivotally mounted on the lower side members of the load supporting means for enabling pivotal movement thereof about the longitudinal axis of the respective lower side members for positioning the rear supporting members, braces and tension members in a desired orientation in relation to the vehicle.

2. The structure as defined in claim 1 wherein said vehicle is provided with a rear deck extending rearwardly and generally horizontally from the bottom edge of the rear window, said rear supporting members engaging the top surface of the rear deck and being disposed at an angle slightly less than 90 degrees in relation thereto with the angle being included between the rear deck and rear supporting members and opening rearwardly thereof for providing a fulcrum support for the platform, said tension member preventing rearward fulcruming of the platform about the rear supporting members.

3. The structure as defined in claim 2 wherein the rear deck of the vehicle is provided with a swingable closure lid movable in a vertical plane, said platform being disposed above the rear deck a distance sufficient to enable the closure lid to swing to an open position without interference.

References Cited by the Examiner

UNITED STATES PATENTS 2,812,087   11/57   Zoller _____ 214—450

FOREIGN PATENTS

| 976,846 | 11/50 | France. |
| 1,079,548 | 5/54 | France. |
| 105,463 | 9/42 | Sweden. |
| 159,099 | 6/57 | Sweden. |

HUGO O. SCHULZ, *Primary Examiner.*